Aug. 13, 1935.  E. J. KINGSBURY  2,011,000
UNIVERSAL TYPE MACHINE TOOL UNIT WITH DIFFERENTIAL FEED
Filed Aug. 18, 1933  5 Sheets-Sheet 1
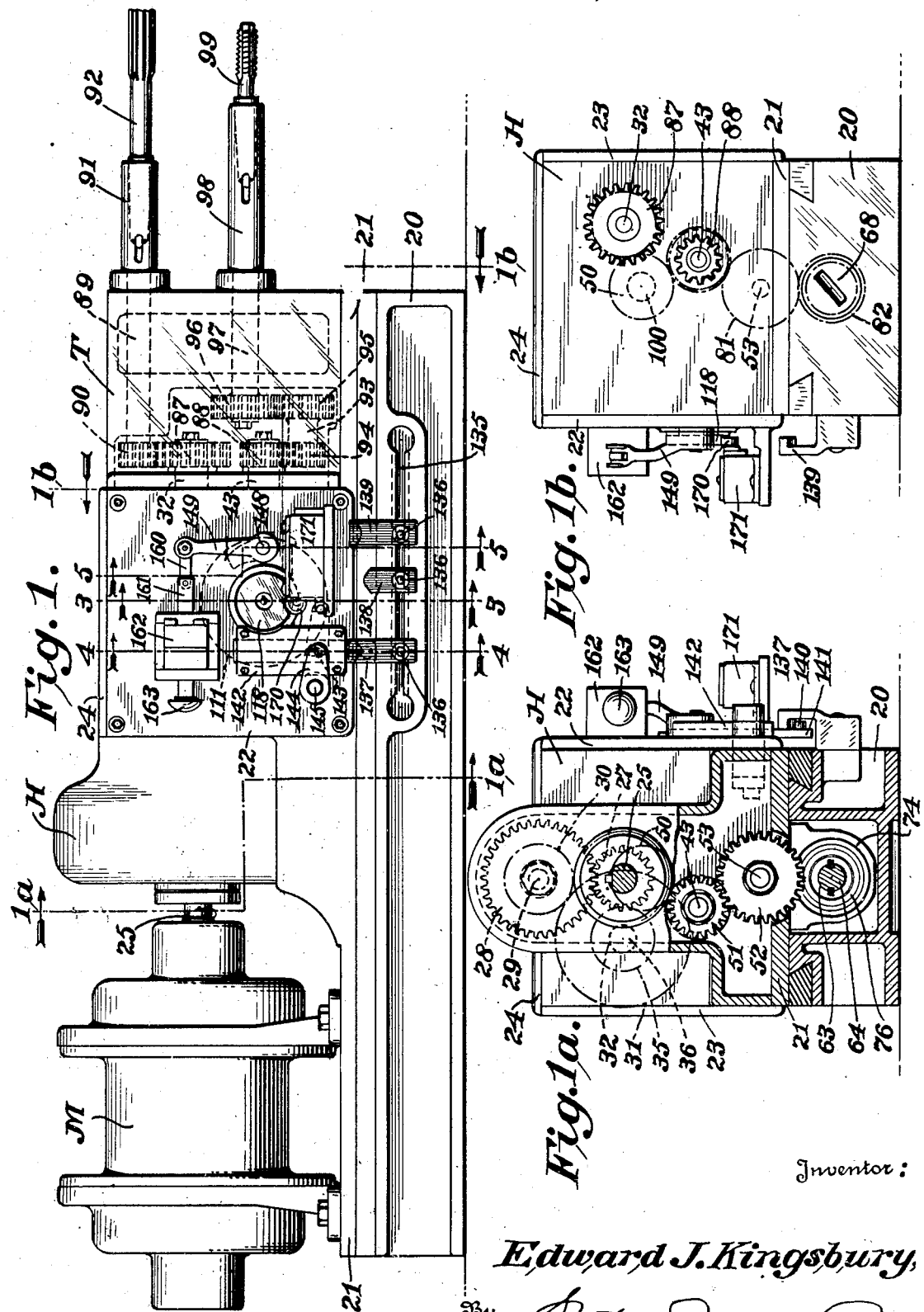
Inventor:
Edward J. Kingsbury,
By
Attorneys

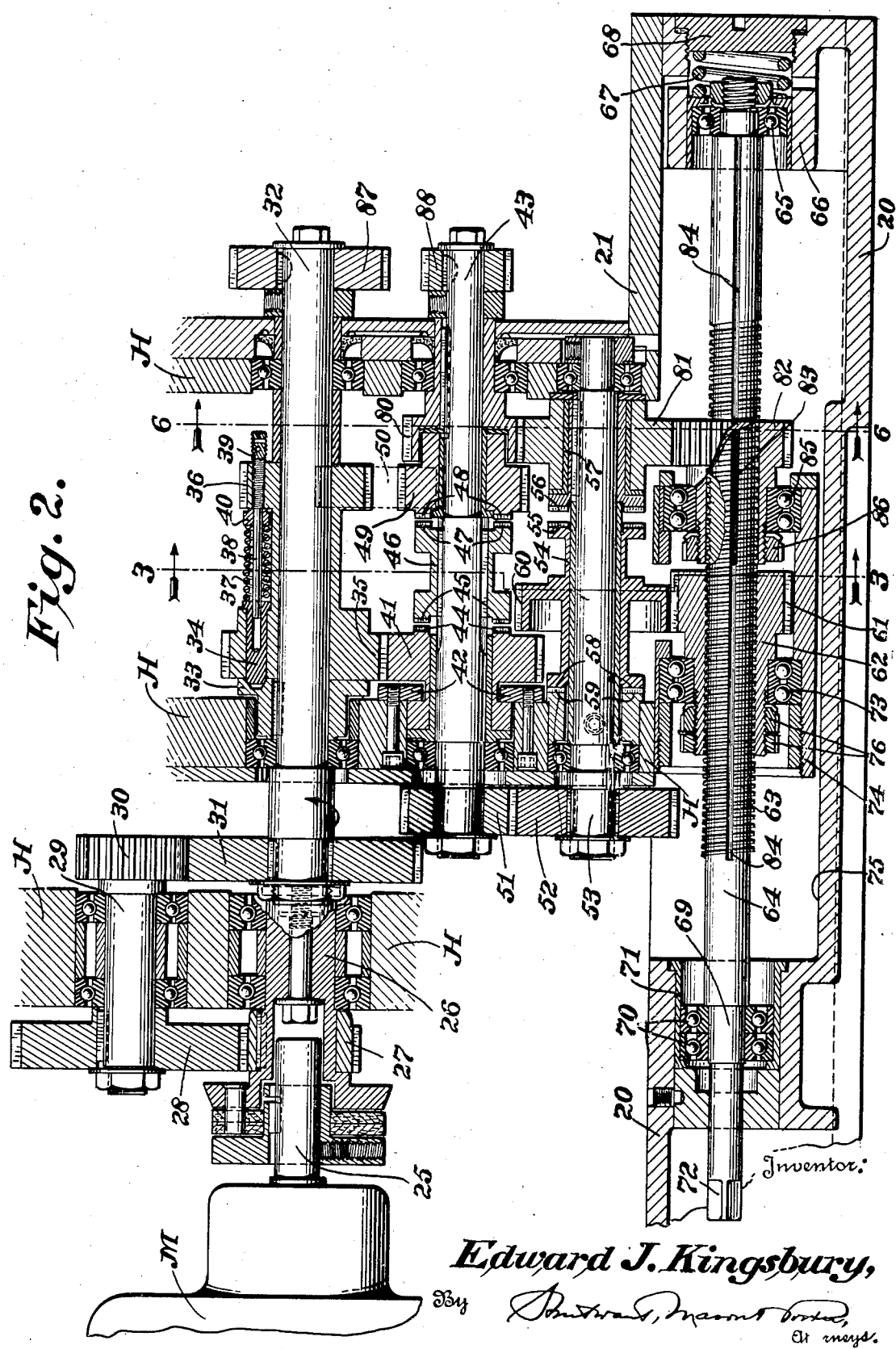

Aug. 13, 1935.　　　　E. J. KINGSBURY　　　　2,011,000
UNIVERSAL TYPE MACHINE TOOL UNIT WITH DIFFERENTIAL FEED
Filed Aug. 18, 1933　　　5 Sheets-Sheet 3
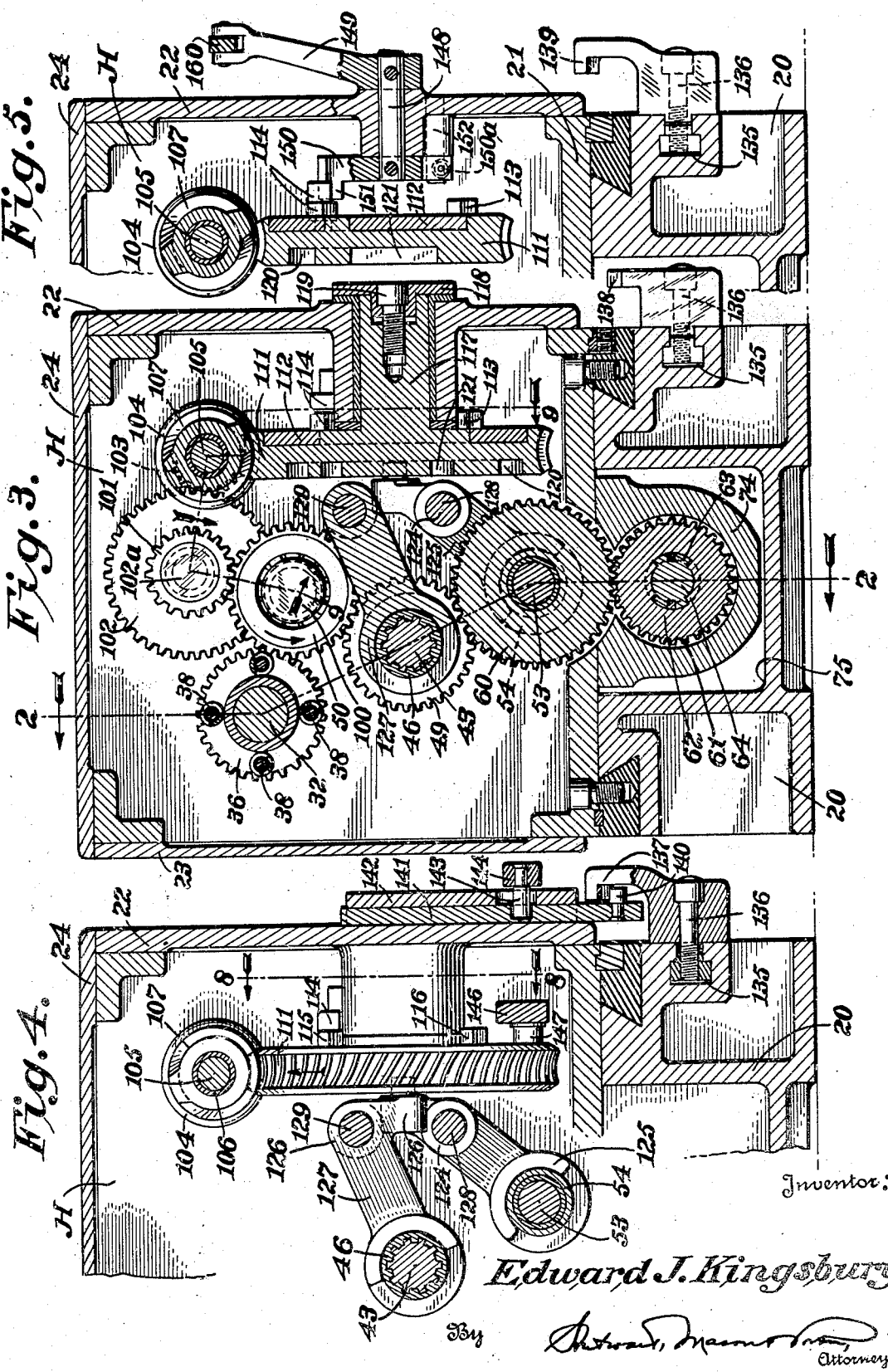

Edward J. Kingsbury,
Inventor

Aug. 13, 1935. E. J. KINGSBURY 2,011,000
UNIVERSAL TYPE MACHINE TOOL UNIT WITH DIFFERENTIAL FEED
Filed Aug. 18, 1933 5 Sheets-Sheet 5
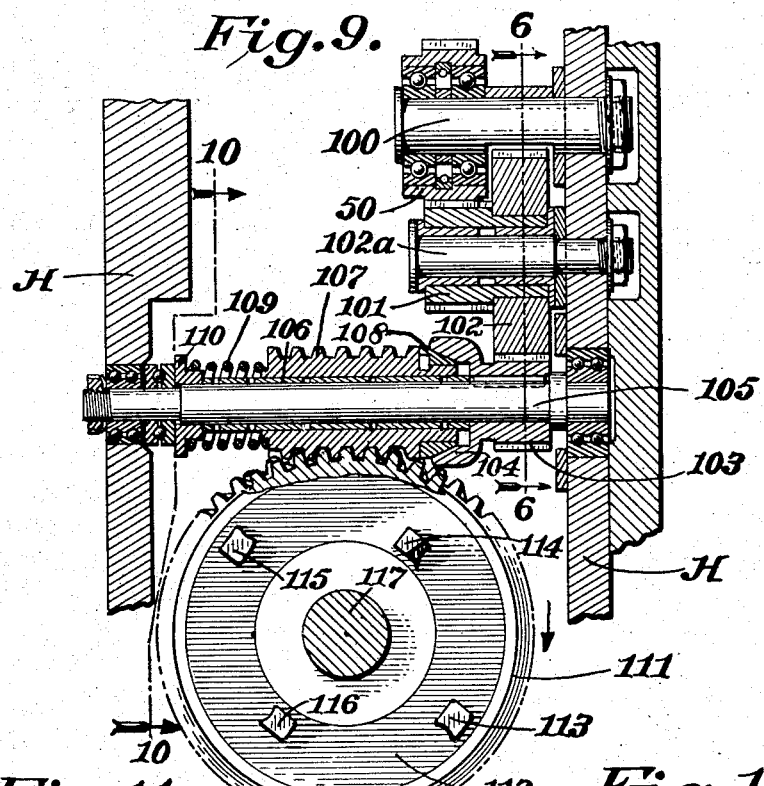
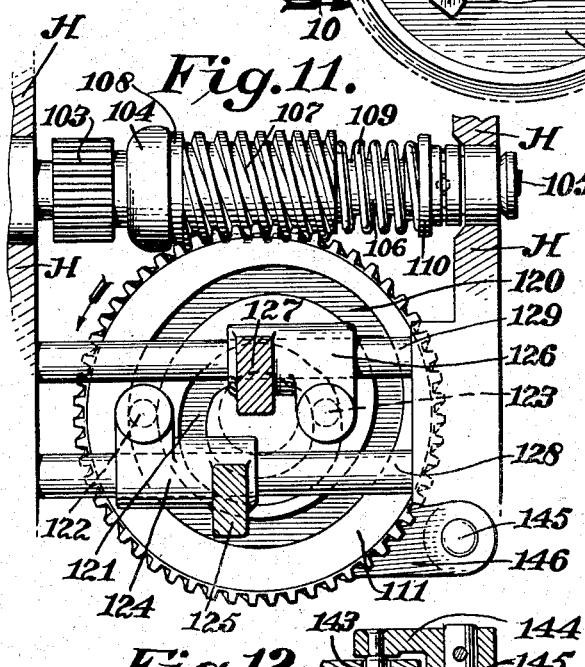
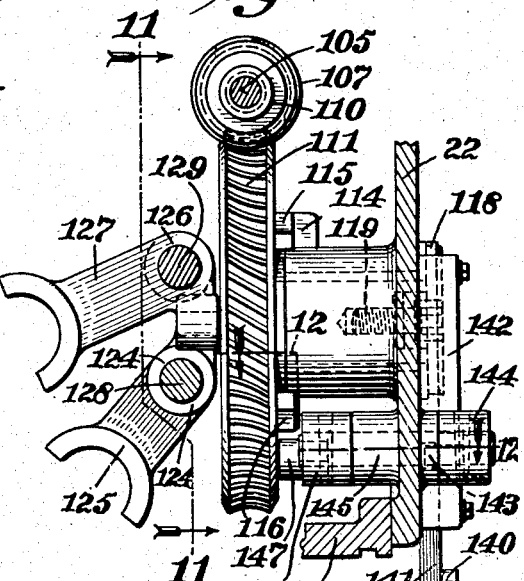
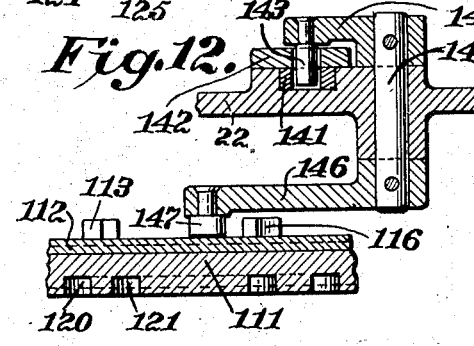
Edward J. Kingsbury,
Inventor Patented Aug. 13, 1935

2,011,000

UNITED STATES PATENT OFFICE 2,011,000

UNIVERSAL TYPE MACHINE TOOL UNIT WITH DIFFERENTIAL FEED

Edward Joslin Kingsbury, Keene, N. H.

Application August 18, 1933, Serial No. 685,760

12 Claims. (Cl. 10—128)

This invention relates to improvements in machine tool units including means for driving and feeding a tool with respect to the work.

One of the features of the present invention is the provision of such a tool unit with two tool devices, of such nature that one tool may be constantly rotated while the other tool is reversed with reversal of feeding movement of the tool, whereby a tap or like tool may be used.

Another feature of the present invention is the provision of a machine tool unit having a single driving motor for delivering its power to the tool, to the feeding means for the tool, and to a control for the feeding means, the driving system to the feed controlling means including a slip clutch, together with stops for limiting the movement of a feed control structure so that predetermined conditions of feed may be accomplished.

A further feature of the present invention is the provision of a feed control mechanism including a continually rotated device with movable stops for intermittently limiting the movement of such device, and means on two structures which move with relation to one another during feeding, said means operating for moving said stops.

Still another feature of the present invention is the provision of a feed control including cam devices and two pairs of clutches operated thereby, together with stops for limiting and determining the intermittent movement of the cam devices, and a driving system including said clutches for selectively providing a plurality of speeds and directions of feed.

A still further feature of the invention is the provision of a feed control mounted on a movable carriage and including a feed control device which is intermittently moved by angular increments, together with feeding mechanisms selectively operated by said device, and means on a fixed frame for controlling the movement of said device.

Still another feature of the present invention is the provision of a feed control mechanism driven independently of a feed mechanism, with pairs of double clutches in said feed mechanism which are selectively operated by said feed control mechanism, one of said clutches being capable of engagement with a non-rotatable structure whereby to prevent rotation of a portion of the feeding mechanism under predetermined conditions of feed control.

Still further features of the invention relate to specific forms of construction and will be apparent in the course of the following specification and claims.

An illustrative form of construction is set forth in the accompanying drawings, in which:

Figure 1 is a side elevation of the apparatus with a tool unit in position thereon which is provided with a reamer and a tap.

Figures 1a and 1b are respectively transverse upright sections substantially on lines 1a—1a and 1b—1b of Figure 1.

Figure 2 is a development view, on a larger scale, of the driving system, substantially on line 2—2 of Figure 3, but with the several shafts shown in a single plane to represent the driving connections between these shafts.

Figure 3 is an upright sectional view, substantially on lines 3—3 of Figures 1 and 2.

Figures 4 and 5 are fragmentary similar views substantially on lines 4—4 and 5—5 of Figure 1.

Figure 6:
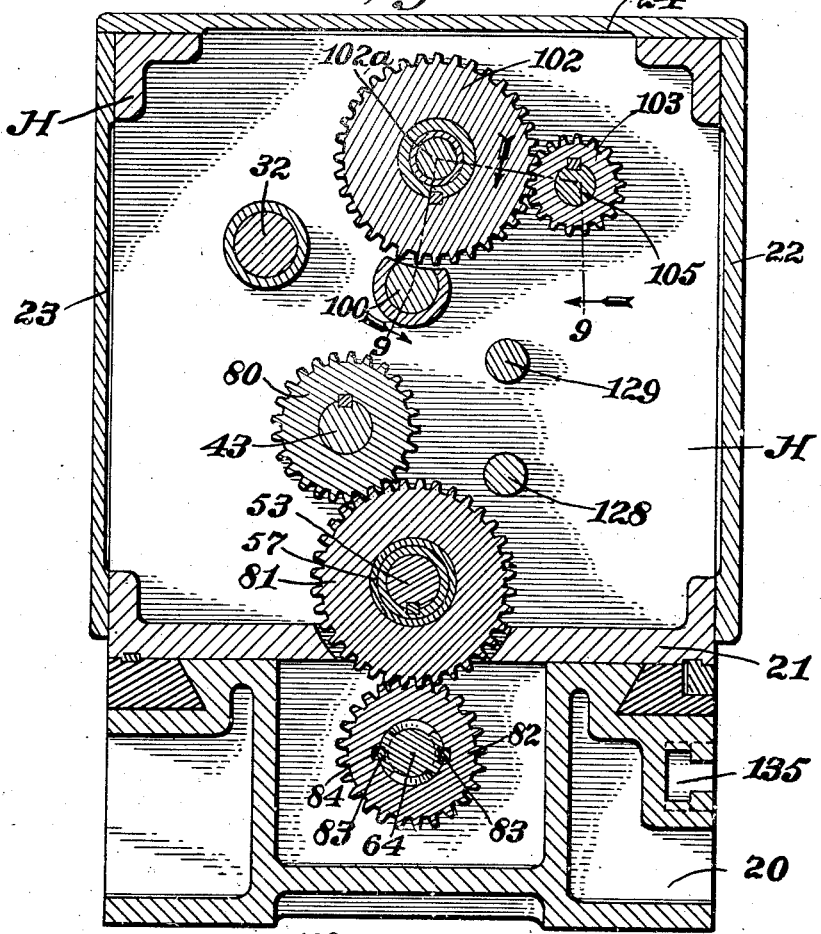

Figure 6 is a similar view substantially on lines 6—6 of Figures 2 and 9.

Figures 7, 8:
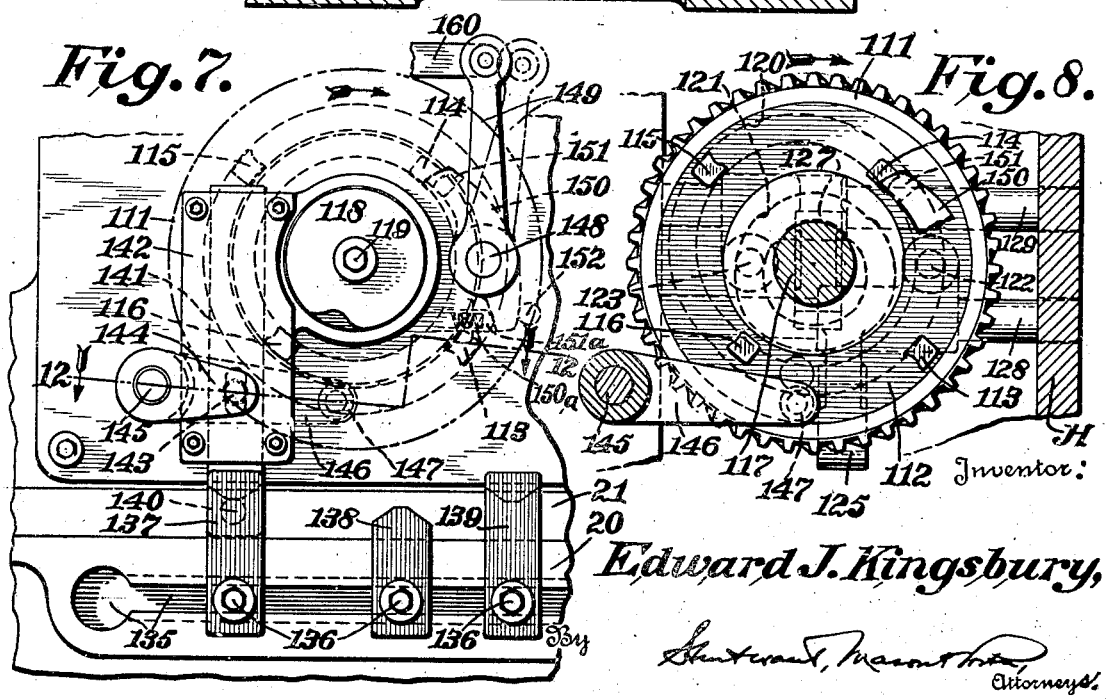

Figure 7 is a fragmentary elevation of parts shown in Figure 1, and indicating in dotted lines certain parts located inside the housing side plate.

Figure 8 is a fragmentary longitudinal upright sectional view substantially on line 8—8 of Figure 4.

Figure 9 is a development view substantially on the broken line 9—9 of Figure 3.

Figure 10 is a fragmentary transverse sectional view substantially on line 10—10 of Figure 9.

Figure 11 is a longitudinal sectional view substantially on line 11—11 of Figure 10.

Figure 12 is a horizontal sectional view substantially on lines 12—12 of Figures 7 and 10.

The apparatus illustrated on the drawings includes a fixed frame and a travelling carriage movable reciprocably along the frame. This travelling carriage supports the driving motor, gearing for operating the tool spindles and for operating the feeding mechanism, and an interchangeable tool unit for supporting the tools and for obtaining the desired drive of the same from the spindle driving means, as well as feed control mechanisms operatively associated with adjustable fixed dogs on the frame for obtaining the desired reciprocating feeding movement of the carriage with respect to the frame. The feed control structure includes electrical devices whereby the structure according to the present invention is adapted for incorporation in a unit-assembled machine tool including one or more of these units along with a turret control unit: such arrangements have been shown in my prior applications Serial No. 405,172, filed November 6, 1929; Serial No. 607,839; filed April 27, 1932; Serial No. 633,888; filed Sept. 19, 1932; and in conjunction with the indexing units shown and described in my application Serial No. 683,541; filed August 3, 1933 and Serial No. 676,574; filed June 19, 1933.

In Figure 1 of the drawings, the fixed frame 20 has a carriage 21 reciprocably guided thereon by suitable ways as indicated in Figure 2. This carriage supports a main driving motor M, a housing H for a speed reduction gear train and the gears of the speed and feed control mechanisms, and an interchangeable tool unit T. The portion of the housing H containing the speed and feed mechanisms, and their controls, is accessible through the side closing plates 22, 23 and the top closing plate 24.

As shown in Figures 1, 1a and 2, the shaft 25 of the driving motor M is connected through a flexible coupling with a short shaft 26 having a small gear 27 thereon in mesh with a large gear 28 on a counter shaft 29 having a small gear 30 in mesh with a large gear 31 on the main driving and speed shaft 32. Shafts 25—26 and 32 are offset with respect to one another as shown in Figure 1a, although apparently appearing in the same plane in Figure 2. This speed reduction system produces the desired speed of shaft 32 before operation of motor M. It will be understood that this motor is in operation constantly while the apparatus is connected for drive, so that the main driving shaft 32 is turning constantly in a given direction.

Keyed to the main speed and feed shaft 32 is a driving member 33 having cavities in one axially directed face, for cooperation with the driving pins 34 which are axially movable in one portion of the body of a gear member having a first set of gear teeth 35 of large diameter thereon and a second set of gear teeth 36 of smaller diameter. In Figure 2, one of these pins is shown in section, with its associated parts: while the positions for four such pins are shown in Figure 3. The pin 34 is normally urged toward the left in Figure 2 by an adjustable spring 37 and is guided by a rod 38 carried by an adjustable screw 39 which is threadedly engaged in the body structure which has the set of gear teeth 36. A reaction collar 40 is forced toward the left by screw 39 for adjusting the compression of spring 37, whereby to determine the relative torque effect between members 33 and 34 at which the beveled ends of pins 34 will be forced axially toward the right (Fig. 2) for disconnecting the drive at overload. The main speed and feed shaft 32 is free to turn within the gear assembly 35, 36 when the drive is thus interrupted.

The set 35 of gear teeth of larger diameter are in mesh with a gear 41 having a grooved member engaged by plates 42 for preventing relative axial movement of gear 41 along the second and reversible speed shaft 43 upon which it is mounted, but permitting free relative rotation of the gear 41 with respect to the second speed shaft 43. The gear 41 also has clutch teeth 44 at one face thereof for engagement with clutch teeth 45 of a clutch member 46 having a second set of clutch teeth 47 for engagement with clutch teeth 48 of a gear 49 which likewise is free for rotation about the axis of the second speed shaft 43 and is in mesh with an idler gear 50 which is driven from the smaller set of gear teeth 36. Thus, accordingly as the clutch 46 is in one or another position, the clutch member is rotated in one or the other direction at speeds dependent upon the ratios of pitch diameters in the gear teeth 35—41 or 36—49. Clutch member 46 is splined to the second speed shaft 43 and drives the latter.

At one end of the second speed shaft 43 is keyed a gear 51 which is in mesh with a larger gear 52 on a feed control shaft 53 which has mounted thereon for free rotation a clutch member 54 having clutch teeth 55 at one end for engagement with clutch teeth 56 on a sleeve 57 keyed to feed control shaft 53. Clutch member 54 also has a second set of clutch teeth 58 thereon for engagement with clutch teeth 59 held fixedly to the housing H. The clutch member 54 also has a gear 60 formed integrally therewith and in mesh with gear teeth 61 on a nut 62 which is engaged with the threads 63 of the rotating feed spindle 64. This feed spindle is mounted, by a ball bearing 65 at one end, in a portion 66 of the fixed frame 20, being normally forced toward the left by a cushioning spring 67 to which access may be gained through a closing plug 68 at this end of the frame 20. Adjacent the other end of the feed spindle 64 it is provided with a reduced portion 69 for receiving anti-friction bearings 70 which may adjust themselves within a sleeve 71 likewise supported by the fixed frame 20. The squared end 72 of feed spindle 64 may be turned manually during preliminary adjustments of the apparatus. The nut 62 is supported by anti-friction bearings 73 carried by a downward extension 74 of the carriage which is located within an oil sump space 75 (Fig. 3) provided in the fixed frame. Nuts 76 are engaged with the nut 62 and act in cooperation with the anti-friction bearings for preventing relative axial movement of the nut with respect to the extension 74.

Keyed to the second speed shaft 43 is a gear 80 which is in mesh with a gear 81 carried loosely for rotation about the axis of the feed shaft 53 and operating as an idler to transmit the drive of gear 80 to a gear 82 which surrounds the spindle 64 and is provided with keys 83 (Figs. 2 and 6) engaged in keyways 84 of spindle 64. Gear 82 is supported by anti-friction bearings 85 for free rotation in the downward extension 74 and a nut 86 is provided to prevent relative axial movement of gear 82 with respect to extension 74. Thus, when the second speed shaft 43 is driven in one or the other direction, the feed spindle 64 is rotated in the same direction and at a speed controlled by the ratio of gears 80 and 82.

Gears 87 and 88 are keyed to the forward ends of the first and second speed shafts 32 and 43 (to the right in Figs. 1 and 2) and are employed for driving the tools carried by the interchangeable tool unit T. For this purpose, as shown with the illustrative tool unit T in Figure 1, the tool unit supports a first tool shaft 89 having a gear 90 in mesh with gear 87 and having externally of the tool unit T a tool holder 91 in which is mounted a reamer 92. Since the first speed shaft 32 turns constantly in one direction, the tool mounted thereon turns always in one direction regardless of its feeding to and from the work. Similarly, a countershaft 93 is provided within the tool unit T and has a gear 94 in mesh with gear 88 and a gear 95 in mesh with a gear 96 on a second tool shaft 97 which is provided externally of the tool unit T with a second holder 98 which may support a tap 99. Since the second speed shaft 43 is reversed periodically during the forward and reverse feeding movements of the carriage with respect to the work, and always turns at a speed which is in unison with the feeding movement of the carriage, the tap is properly engaged with the work both during rapid and slow movements, in either direction. Taps of any thread pitch may be employed by a proper selection of gears 51—52, 88—94 and 95—96.

The idler gear 50 is supported for rotation about a fixed shaft 100 (Figs. 3 and 6) and is in mesh not only with gears 49 and 36, but also with a pinion 101 (Figs. 3 and 9) on pin 102a and fixed to a gear 102 which drives a small gear 103 integral with a friction driving clutch member 104 and keyed to a supporting shaft 105 therewith in the housing H (Fig. 9).

An anti-friction bearing sleeve 106 surrounds the shaft 105 and receives a worm 107 for free relative rotation, this worm being provided with a second friction clutch member 108 engageable with clutch member 104, and being normally forced toward engagement with this clutch member 104 by a spring 109 which has reaction against a thrust bearing 110. Worm 107 is engaged with the teeth of a worm wheel 111 which is constructed at the face adjacent the closing plate 22 with an inserted and fixedly mounted ring 112 having four pins 113, 114, 115, 116 thereon; the pins 113, 115 being at greater radial distances from the axis than pins 114, 116 and pin 114 being higher than pin 116. The worm wheel 111 is illustrated as constructed integrally with a shaft portion 117 which is mounted in a bearing on the closing plate 22 and extends to the exterior thereof, so that an end plate 118 and screw 119 are operative to hold the worm wheel against axial movement. The face of the worm wheel 111 remote from the side plate 22 is provided with an outer cam track 120 and an inner cam track 121 (Figs. 8 and 11) in which respectively engage the control fingers 122 and 123. Finger 122 is carried by a block 124 having a downwardly and inwardly extending fork 125 for engaging in the groove of clutch 54. Similarly, control pin 123 is supported by a body 126 having a downwardly and inwardly projecting fork 127 for engagement in the groove of clutch 46. The control bodies 124 and 126 are slidable on guide rods 128 and 129 which are mounted in the walls of housing H. Thus, as the worm wheel 111 rotates, the clutch pins 122, 123 are shifted in predetermined relationships to one another and thus the control of the feeding system is effected.

Normally, the motion of the worm wheel 111 is arrested at intervals, and then permitted to proceed. During the quiescent intervals of worm wheel 111, the continued drive from gear 103 causes the worm 107 to back up, so to speak, on the worm wheel 111 and break the frictional drive between friction members 104 and 108. The worm wheel 111 turns continually in one direction only as indicated by the arrows in Figures 7, 8, 9 and 11.

The intermittent rotation of worm wheel 111 may be controlled by dogs fixed on the frame. As shown in Figures 1 and 7, the frame 20 is provided with a structure having a T slot 135 for receiving the binding screws 136 of three dogs, 137, 138 and 139. Dog 137 is provided with a downwardly directed inclined surface for moving the pin 140 (Figs. 4 and 7) of a vertical plunger 141 downwardly when this plunger is presented to the dog 137. Correspondingly, the dog 138 has an upwardly directed and doubly inclined surface for pushing the pin 140 upwardly. The dog 139 has a downwardly directed surface similar to that of dog 137 and operating in the same way. A guide 142 on side plate 22 supports the plunger 141 in its vertical movements as determined by the dogs 137, 138 and 139. A pin 143 projects through the guide 142 and is carried by an arm 144 mounted on a rock shaft 145 extending through the side plate 22 (Figs. 7 and 12) and provided inside the housing H with a blocking arm 146 having a roller 147 which may engage selectively with the pins 113, and 115.

A second rock shaft 148 (Figs. 5 and 7) is mounted in the side plate 22 and is provided externally thereof with an upwardly extending arm 149. Inside the housing H, the second rock shaft 148 is provided with a blocking finger 150 having an offset end 151 which may engage only with the high portion of inner pin 114 (Fig. 5) and is normally held in position for such engagement by a pressure spring 150a and plunger 151a, its position being determined by a stop pin 152.

As shown in Figure 1, the external arm 149 is preferably connected by a link 160 to the armature or plunger 161 of a solenoid 162, this plunger extending through the rear of the solenoid 162 and having a manually operable knob 163 thereon. The securing plate 118 for the shaft 117 of worm wheel 111 is preferably formed as a cam, so that at one position of worm wheel 111 the operating roller 170 of a circuit closing switch 171 is actuated. This closing occurs when the carriage has reached the limit of its withdrawn position, i. e., the position as indicated in Figure 1: and the switch is connected in a control circuit which accomplishes the energization of the turret unit for indexing of a new piece of work to this apparatus, in the manner described in my aforesaid co-pending applications.

Similarly, when the turret unit has completed the indexing of a new piece of work, the turret unit closes a circuit in a manner described in said applications, whereby to energize the solenoid 162 and thus actuate the plunger 161 to start the apparatus into movement for a new cycle of operation.

The operation of this structure is as follows:

The apparatus has completed a cycle and is ready for a new actuation when it is in the position of Figure 1, with the carriage fully withdrawn with respect to the frame, i. e., in its lefthand position. The motor is rotating, and tool 92 is turning at the speed predetermined by the gear trains. The tap 99 is at a standstill. Vertical plunger 141 has been raised by the reverse limit dog 137, and roller 147 on arm 146 is ready to engage an outer pin 113 after the worm wheel 111 has begun to move. Finger 150—151 is engaged with an inner pin 114 (Figs. 7 and 8) and holds worm wheel 111 stationary. Cam track 120 is holding pin 122 and fork 125 in an intermediate position so that clutch 46 is disengaged from teeth 44 and 48. The second speed shaft 43 is thus at a standstill. Cam track 121 is holding pin 123 and fork 127, and therewith the clutch 54 in the lefthand position as shown in Figure 2. Neither the nut 62 nor gear 82 is rotating.

To start the cycle, the knob 163 is operated manually, or the solenoid 162 is energized from a remote point. The lever arm 149 is thus moved in a clockwise direction in Figures 1 and 7, from the full line to the dotted line position in Figure 7 whereby finger 150, 151 releases the pin 114. The drive which has been occurring from motor M to the first speed shaft 32 and therewith from gear 36 through idler 50, pinion 101, gear 102, gear 103 to clutch member 104 is now permitted to operate as the spring 109 forces worm 107 and its friction member 108 into engagement with friction member 104. The worm wheel 111 is thus given a partial rotation until pin 113 encounters roller 147 and is stopped thereby. The cam track 121 has then moved the pin 123 and shifted clutch 46 to the left (Fig. 2). Clutch teeth 45 are engaged with clutch teeth 44. Cam track 120 has held pin 122, so that the clutch teeth 58 are still engaged with the clutch teeth 59 on the frame H.

A rapid forward feeding now occurs from shaft 32, through gears 35—41, clutch teeth 44—45, clutch 46, second speed shaft 43, gears 80—81—82, so that gear 82 causes a rotation of spindle 64. At the same time, the engagement of clutch teeth 58—59 holds the gear 60 and therewith gear teeth 61 on nut 62 stationary, and the spindle 64 turns in the nut 62 and forces this unit toward the right in Figure 2.

This rapid forward feeding continues as long as worm wheel 111 is held against movement by the blocking action of latch roller 147 while engaged with pin 113.

When the pin 140, in its travel with the carriage, encounters the dog 138 fixed on the frame, the pin is raised and therewith the plunger 141 so that the roller 147 is raised and releases the pin 113. The worm wheel can now turn. During this turning of the worm wheel, the cam track 120 does not move the corresponding pin 122, so that clutch 46 remains in its lefthand position, and clutch teeth 44—45 are engaged. The movement of the worm wheel, however, operates through cam track 121 and the corresponding pin 123 to cause a movement of the lower clutch 54 toward the right in Figure 2 releasing the engagement of clutch teeth 58—59 and establishing an engagement of clutch teeth 55—56.

The former drive from the main speed and feed shaft 32 to the nut 62 continues. However, a second drive is now established from the rotating second speed shaft 43, through gear 51—52 to feed control shaft 53 and its sleeve 57, by clutch teeth 56—55, clutch 54, gear 60, to the nut 62 so that this nut turns in the same direction as the spindle and thus produces a lesser relative movement per revolution of the spindle than occurred during the rapid forward feeding. For example, if the nut 62 turns at a 10% lesser rate of angular speed than spindle 64, the fine forward feeding of the carriage with respect to the frame is accomplished at one-tenth of the rate of the rapid forward feeding. This relationship of rapid and fine forward feeding can be regulated by proper selection of the relative pitch diameters of gears 51 and 52.

The plunger 141 remains in its upper position by the counter-balancing and friction of the associated parts, and thus the latch roller 147 is in the path of pin 114. During the turning of the worm wheel 111 which has led to this change of the clutches, and therewith the accomplishment of the fine forward feeding, the worm wheel has ultimately presented its pin 114 to the latch roller 147 so that the worm wheel is again brought to a standstill.

This fine forward feeding continues so long as the worm wheel 111 is held against movement by the blocking action of the roller 147 engaged with pin 114.

When the pin 140, in its travel with the carriage, encounters the dog 139 fixed on the frame, it is moved downwardly again, and roller 147 releases the pin 114 so that the worm wheel can turn again. The plunger 141 is held in the lowered position with roller 147 in the path of pin 115.

The movement of the worm wheel 111 now causes the cam track 120 to move the corresponding pin 122 for shifting the upper clutch 46 toward the right (Fig. 2) so that the clutch teeth 44 and 45 are disengaged, and the clutch teeth 47 and 48 are engaged. Furthermore, the cam track 121 moves its associated pin 123 so that the lower clutch 54 is shifted back to the left again, thus releasing the engagement of clutch teeth 55—56, and re-establishing the engagement of clutch teeth 58—59. As in the rapid forward feeding, the nut 62 is now held against relative rotation, for effecting a rapid reverse feeding. The drive for this purpose is obtained from the first speed shaft 32 by gears 36—50—49, clutch teeth 48—47, second speed shaft 43, gears 80—81—82, and the spindle 64 is turned in the opposite direction than before, by reason of the inclusion of the idler 50 in this gear train.

The turning of the worm wheel 111 is ultimately blocked by the engagement of roller 147 with pin 115. This, however, terminates when the pin 140 in its reversed movement with the carriage again encounters the fixed dog 138 so that the plunger 141 and latch roller 147 are raised again. The worm wheel 111 is then permitted a further rotational movement until pin 116 encounters the latch roller 147. During this further movement, the cam tracks 120 and 121 are circular and no movements of the clutches occur.

Ultimately, the pin 140 encounters the reverse limit dog 137 on the frame and is pulled downward thereby, so that the plunger 141 and latch roller 147 move downward and release pin 116. The cam track 120 now operates on pin 122 to cause a movement of clutch 46 to a central or neutral position (shown in Fig. 2), where a driving of the second feed shaft 43 is prevented. The cam track 121 is circular for this portion of the movement of worm wheel 111, and there is no movement of the lower clutch 54. The movement of the worm wheel 111 is now interrupted (in the position of Figs. 7 and 8) by the engagement of finger 150, 151 with the high portion of pin 114.

The apparatus has thus made a complete cycle of movement, and has returned to its initial position.

While the apparatus has been described in an illustrative embodiment, it is apparent that the invention is not limited specifically thereto, but that it may be varied in many ways within the scope of the appended claims.

Having thus described the invention, what I claim as new and desire to secure by Letters Patent, is:—

1. In an apparatus of the class described, a frame, a carriage movable back and forth relative to the frame, a main shaft, a tool holder connected to said main shaft for drive therewith, forward and reversing members joined together and rotatable about the axis of said main shaft independently of the rotation thereof, a slip clutch for connecting said members to said main shaft for drive therefrom, a reversible shaft and means for connecting the same to said members and including shiftable clutch elements, and a tool holder connected to said reversible shaft for drive therewith.

2. In an apparatus of the class described, a frame, a carriage movable back and forth relative to said frame, a motor, a reversible shaft and feeding elements driven thereby for moving said carriage, means for selectively rotating said reversing shaft from said motor and including shiftable clutch elements, a cam for selectively shifting said clutch elements, means for driving said cam from said motor, means for preventing the movement of said cam, and interengaging means on the carriage and frame for releasing said preventing means when the carriage attains predetermined positions relative to said frame.

3. An apparatus as in claim 2, including a second set of clutch elements also shifted by said cam and operative in one position for connecting said reversible shaft to said feeding elements and in another position for preventing movement of at least one element of the feeding mechanism.

4. An apparatus as in claim 2, including a second set of clutch elements also shifted by said cam and selectively operative for controlling the drive from said reversible shaft for moving said carriage, said cam being located on a wheel driven by said motor, and in which said preventing means operates to limit the movement of said wheel after predetermined angular increments, and said interengaging means releases said preventing means for producing successively in cycle a rapid forward feed, a slow forward feeding and a rapid reverse feeding.

5. In an apparatus of the class described, a frame, a carriage movable back and forth relative to said frame, a motor, a main shaft driven by said motor, a reversible shaft, forward and reverse driving elements for connecting said main and reversible shafts and including shiftable clutch elements, means for feeding said carriage relative to the frame connected for drive by said reversible shaft and including shiftable clutch elements, a cam having two cam tracks, clutch shifting devices engaged with the clutch elements and in said tracks for selectively shifting the clutch elements, stop members on said cam, means for driving said cam from the motor including a slip connection, and cooperative means on the carriage and frame for releasing and engaging said stop members at predetermined positions of the carriage relative to said frame.

6. In an apparatus of the class described, a frame, a carriage movable back and forth relative to said frame, a motor, feeding means driven from said motor for feeding the carriage relative to the frame and including shiftable clutch elements, a cam wheel and means for driving the same from said motor, means for preventing movement of said cam wheel and releasing the drive thereof, means for releasing said preventing means at predetermined positions of the carriage relative to the frame, further stop means for detaining said cam wheel at a predetermined angular position for determining the beginning and end of a cycle of carriage movements, and remotely controllable means for releasing said further stop means.

7. In an apparatus of the class described, a frame, a rotatable spindle journalled on said frame and having threads and a keyway, a carriage movable back and forth relative to said frame, a nut member on said carriage engaged with the spindle thread, a member journalled on said carriage engaged with the keyway for rotating said spindle, and means selectively operable to rotate said nut and carriage member in the same or opposite directions and for holding one or both of said members at a standstill.

8. An apparatus as in claim 7, in which said selectively operable means includes a reversible shaft, a motor and first selecting clutch devices for driving said reversible shaft in one or the other direction, means including second selective clutch elements for connecting said nut member to said reversible shaft or to the frame, clutch shifting members driven from the motor, and means controlled by the relative position of the frame and carriage for stopping and starting said shifting members.

9. An apparatus of the class described, a frame, a carriage movable back and forth relative to said frame, a source of power, means including clutches driven by said source of power for producing feeding movements of the carriage relative to said frame, a cam wheel rotated from said source, stop members on said cam wheel, shiftable means engageable with said stop members for limiting the rotation of the cam, selectively positionable dogs on said frame, means on said carriage cooperative with the dogs for shifting said engageable means, and devices actuated by the cam wheel during rotative movement thereof for selectively moving said clutches.

10. In an apparatus of the class described, a frame, a carriage movable back and forth relative to said frame, a rotatable spindle journalled on said frame and having threads and a keyway, a motor on said carriage, a main shaft on said carriage driven from said motor, a reversible shaft on said carriage, a feed control shaft on said carriage, forward and reverse driving devices for connecting said main shaft and reversible shaft and including first selective clutch elements, a nut member on said carriage engaged with the spindle threads, means including second selective clutch elements for connecting said feed control shaft to said nut member or to said carriage whereby to produce a rotation of said nut member with the reversible shaft or to hold the nut member at a standstill, a rotatable member carried by said carriage and engaged in said keyway for rotating said spindle, means for driving said rotatable member with the reversible shaft, and clutch actuating devices mounted on said carriage including means for driving the same from said motor, said shafts and spindle being mounted with their axes parallel to one another.

11. In an apparatus of the class described, a frame, a carriage movable back and forth relative to said frame, a source of power, a main shaft driven from said source, a reversing shaft, forward and reverse driving means for connecting said reversing shaft with said main shaft and including shiftable clutch elements for determining the direction of drive, an interchangeable tool head mounted on said carriage and having two tool holders, connections from said main shaft to one said tool holder, connections from another tool holder to said reversible shaft, and devices for shifting said clutches whereby simultaneously to change the direction of feed of the carriage relative to the frame and to change the direction of rotation of said other tool holder.

12. In an apparatus of the class described, a frame, a spindle journalled on said frame for rotation about its own axis, said spindle having threads and a keyway thereon, a cushion spring for urging said spindle in one direction and operative to absorb relative movement of the spindle with respect to the frame, a carriage, feeding devices on the carriage including a source of power and a reversible shaft driven therefrom, a rotatable nut member held against axial movement relative to said carriage and engaged with the spindle threads, a rotatable member held against axial movement relative to said carriage and engaged in said keyway for rotating said spindle, and driving means for connecting said members and said reversible shaft.

EDWARD JOSLIN KINGSBURY.